United States Patent Office.

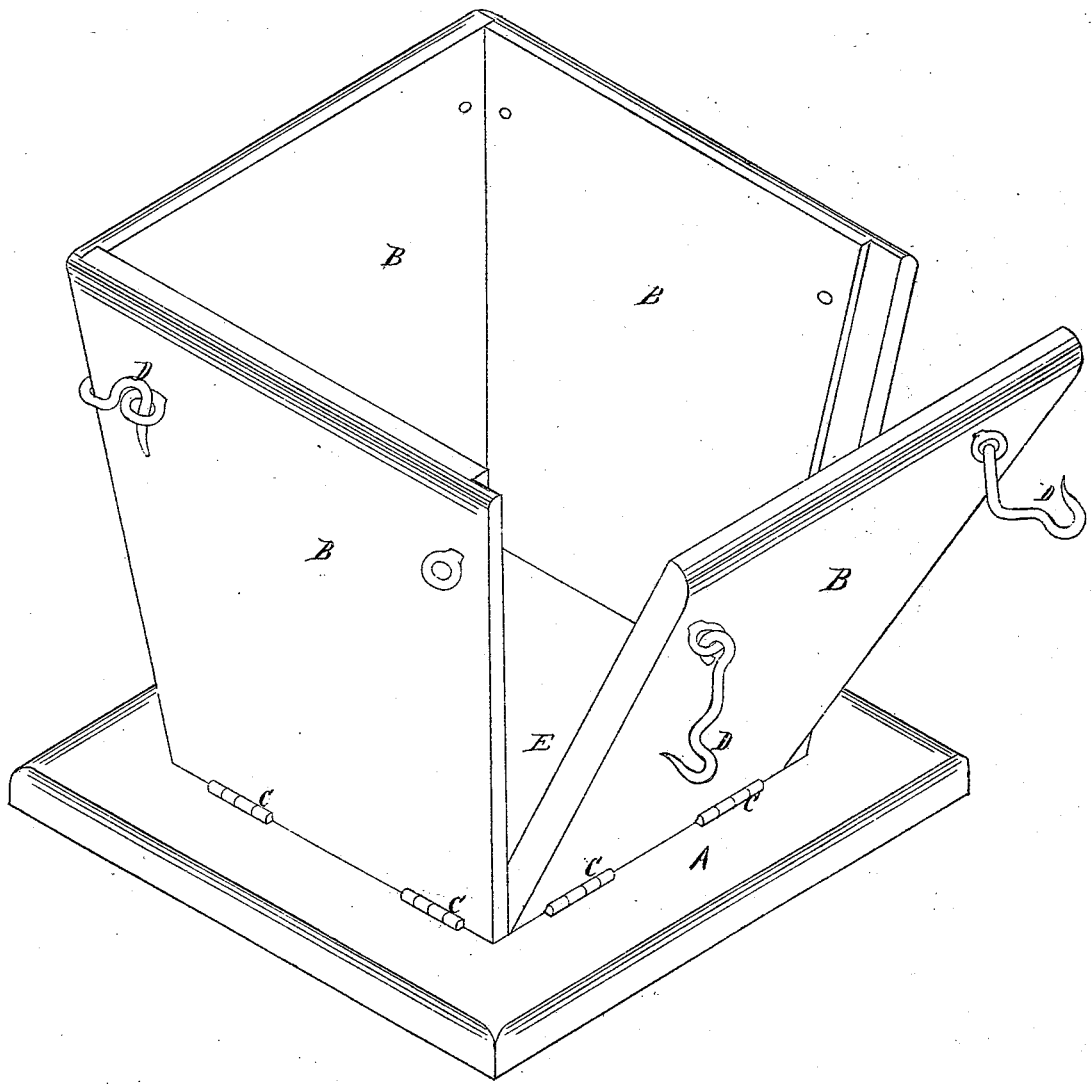

GUSTAF GUSTAFSON, OF OAKLAND, CALIFORNIA.

Letters Patent No. 94,202, dated August 31, 1869.

IMPROVEMENT IN SHRUB AND FLOWER-BOXES.

The Schedule referred to in these Letters Patent and making part of the same.

*To all whom it may concern:*

Be it known that I, GUSTAF GUSTAFSON, of Oakland, county of Alameda, State of California, have invented an Improved Tree and Shrub-Box; and I do hereby declare the following description and accompanying drawings are sufficient to enable any person skilled in the art or science to which it most nearly appertains, to make and use my said invention or improvements, without further invention or experiment.

My invention relates to certain new and useful improvements in that class of boxes used by nurserymen and others, for containing earth, in which small trees and shrubs are grown and preserved for transportation; and It consists in hinging the sides of the box to the base or pedestal upon which they are placed, or which is used for a bottom to the box, so that they may be allowed to fall out, and leave the earth in which the tree or shrub is planted, free to be removed in a mass, which can then be done without disturbing the soil about the roots of the tree.

To more fully illustrate and describe my invention, reference is had to the accompanying drawings, forming a part of this specification, in which—

Figure 1 is a perspective view, in which one side is shown partly open.

The same letters represent identical parts wherever they occur in each of the drawings.

A is the base or pedestal of a box, of that class employed for containing earth in which small trees and shrubs are grown and preserved for transportation.

When the ordinary box is used for this purpose, it is necessary to destroy the box when it is desired to remove the tree or shrub, and this cannot be done without disturbing the roots of the shrub or tree in the soil, and to some extent injuring its growth.

In order to avoid the necessity of destroying the box or injuring the tree or shrub, I make the sides B B so that they will fit together in the proper manner, and attach them to the pedestal A by means of hinges C, or other suitable device, so that they can be raised up and secured by any suitable means in the form of a box.

For securing the sides in position, I employ hooks D, the rods of which are bent at right angles, so as to encircle the outside corners of the box, the hook fastening into a staple on the side next to that to which the hook is attached, but other devices of an equivalent nature can be used for the same purpose.

On the bottom and inside of the box, I place a square block, E, which is just large enough to fit at the base of the sides, which prevents the earth from touching the base A, which would otherwise cause it to become rotten.

The block E can be renewed whenever desired.

The loose or false bottom E should be taken up together with the plant and earth, as it will thus prevent the lower portions of the earth from falling off and leaving the roots bare.

A hole, a, is made through the block E and base A, through which the water, employed for watering the plant, passes off.

When it is desired to remove a plant or shrub, and more particularly trees of larger growth with extended roots, it is only necessary to release the sides and allow them to fall out. This leaves the moulded earth standing around the roots of the tree, after which the tree can be removed to another box or planted in the ground, by carefully taking up the earth and tree as it stands, and placing it wherever desired.

By this means the box as well as the tree can be carefully preserved, and used any number of times without injury.

Having thus described my invention,

What I claim, and desire to secure by Letters Patent, is—

1. A flower, shrub, or tree-box, formed of the sides B, hinged upon the bottom A, and secured together at the top by bent hooks D, or other equivalent device, substantially as described.

2. In combination with the hinged sides B, the loose or false bottom E, substantially as and for the purposes set forth.

In witness whereof, I have hereunto set my hand and seal.

GUSTAF GUSTAFSON. [L. S.]

Witnesses:
J. L. BOONE,
GEO. H. STRONG.